US012726494B2

(12) United States Patent
Golway et al.

(10) Patent No.: US 12,726,494 B2
(45) Date of Patent: Sep. 1, 2026

(54) DETECTING MICROSERVICE SECURITY ATTACKS BASED ON METRIC SENSITIVE DEPENDENCIES

(71) Applicant: HEWLETT PACKARD ENTERPRISE DEVELOPMENT LP, Spring, TX (US)

(72) Inventors: Thomas Golway, Plandome, NY (US); Nigel J. Edwards, Bristol (GB); Shiva R. Dasari, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 386 days.

(21) Appl. No.: 18/307,379

(22) Filed: Apr. 26, 2023

(65) Prior Publication Data

US 2024/0364720 A1 Oct. 31, 2024

(51) Int. Cl.
*H04L 9/40* (2022.01)
*H04L 41/142* (2022.01)

(52) U.S. Cl.
CPC ........ *H04L 63/1425* (2013.01); *H04L 41/142* (2013.01)

(58) Field of Classification Search
None
See application file for complete search history.

(56) References Cited

U.S. PATENT DOCUMENTS 10,027,694 B1 * 7/2018 Gupta ................ H04L 63/1458
10,200,382 B2 * 2/2019 Medvedovsky .... H04L 63/1425
10,635,563 B2 4/2020 Salunke et al.
11,582,589 B2 * 2/2023 Taft ...................... H04W 24/02
11,646,098 B1 5/2023 Mcnair
12,008,046 B1 6/2024 Curtis et al.
2013/0110761 A1 * 5/2013 Viswanathan .... G06F 16/24578 706/52
2018/0027004 A1 * 1/2018 Huang .................... H04L 43/04 726/23
2019/0141061 A1 * 5/2019 Krishtal ................ H04L 63/101
2019/0373007 A1 12/2019 Salunke et al.
2020/0351283 A1 11/2020 Salunke et al.
2020/0364607 A1 11/2020 Bahena Tapia et al.
2021/0004704 A1 * 1/2021 Dang ...................... H04L 67/10
2021/0149587 A1 5/2021 Lukoshkov et al.

(Continued)

OTHER PUBLICATIONS

Ronak_Chokshi, "How AIOps can predict and prevent the hairiest infrastructure problems", available online at <https://community.hpe.com/t5/around-the-storage-block/how-aiops-can-predict-and-prevent-the-hairiest-infrastructure/ba-p/7139325>, Jun. 17, 2021, 5 pages.

*Primary Examiner* — Joshua Joo
(74) *Attorney, Agent, or Firm* — Trop, Pruner & Hu, P.C.

(57) ABSTRACT

A process includes aggregating a time sequence of samples. Each sample has a plurality of dimensions that correspond to respective metrics that are associated with a microservice. Each sample includes, for each dimension, a measurement of the metric that corresponds to the dimension. The process includes identifying a given sample of the time sequence of samples based on measurements of first samples of the time sequence of samples and determining a sensitivity dependency of the metrics based on the measurements of the given sample. The process includes determining whether the microservice has been subjected to a security attack based on the sensitive dependency.

12 Claims, 6 Drawing Sheets

(56) References Cited

U.S. PATENT DOCUMENTS

2021/0149821 A1 5/2021 Cui
2021/0258341 A1* 8/2021 Jaladi ........................ G06F 8/65
2021/0326221 A1 10/2021 Guim et al.
2021/0359955 A1 11/2021 Musleh et al.
2021/0383206 A1 12/2021 Teppoeva et al.
2022/0012095 A1 1/2022 Ylinen et al.
2022/0014459 A1 1/2022 Ganguli et al.
2023/0008658 A1 1/2023 Sonderegger et al.
2023/0069074 A1 3/2023 Chen et al.
2023/0259415 A1* 8/2023 Kairali .................... G06F 9/547 719/328
2023/0283621 A1* 9/2023 Techentin ............... G06F 21/55 726/23
2023/0412629 A1* 12/2023 Beveridge ........... H04L 63/1433

* cited by examiner

Figure 4:
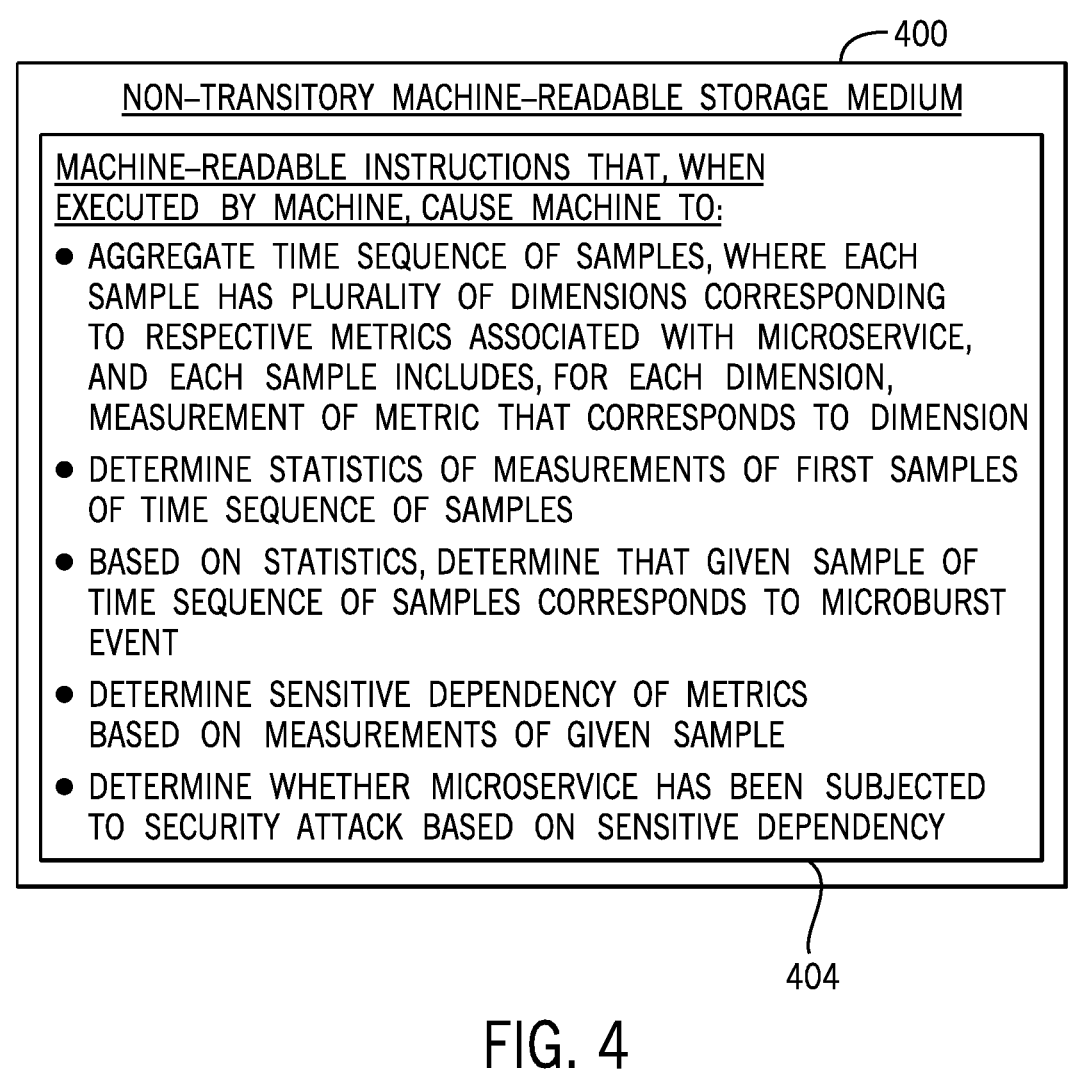

400

NON-TRANSITORY MACHINE-READABLE STORAGE MEDIUM

MACHINE-READABLE INSTRUCTIONS THAT, WHEN EXECUTED BY MACHINE, CAUSE MACHINE TO:

- AGGREGATE TIME SEQUENCE OF SAMPLES, WHERE EACH SAMPLE HAS PLURALITY OF DIMENSIONS CORRESPONDING TO RESPECTIVE METRICS ASSOCIATED WITH MICROSERVICE, AND EACH SAMPLE INCLUDES, FOR EACH DIMENSION, MEASUREMENT OF METRIC THAT CORRESPONDS TO DIMENSION
- DETERMINE STATISTICS OF MEASUREMENTS OF FIRST SAMPLES OF TIME SEQUENCE OF SAMPLES
- BASED ON STATISTICS, DETERMINE THAT GIVEN SAMPLE OF TIME SEQUENCE OF SAMPLES CORRESPONDS TO MICROBURST EVENT
- DETERMINE SENSITIVE DEPENDENCY OF METRICS BASED ON MEASUREMENTS OF GIVEN SAMPLE
- DETERMINE WHETHER MICROSERVICE HAS BEEN SUBJECTED TO SECURITY ATTACK BASED ON SENSITIVE DEPENDENCY

DETECTING MICROSERVICE SECURITY ATTACKS BASED ON METRIC SENSITIVE DEPENDENCIES

BACKGROUND

A computer system may be subject to a security attack in which an attacker seeks to access information that is stored on the computer system or harm components of the computer system. A computer system may have a wide variety of mechanisms (e.g., access controls, malware detection software, firewalls, integrity measurements, and other measures) to detect and prevent security attacks.

BRIEF DESCRIPTION OF THE DRAWINGS

FIG. 4 is an illustration of machine-readable instructions that, when executed by a machine, cause the machine to determine whether a microservice has been subjected to a security attack based on a metric sensitive dependency according to an example implementation.

DETAILED DESCRIPTION

Figure 1:
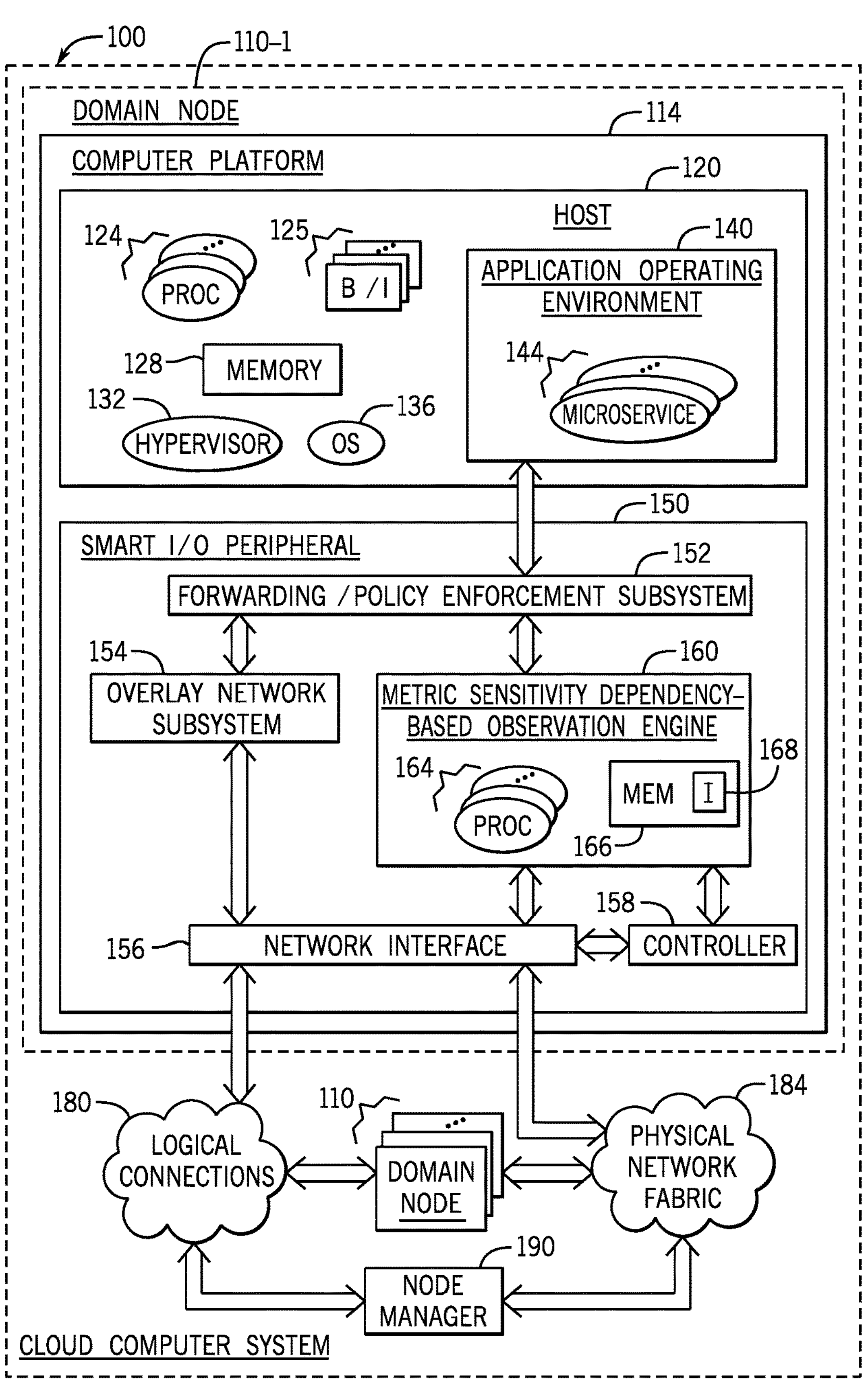
FIG. 1 is a block diagram of a cloud computer system having a smart input/output (I/O) peripheral-based observation engine that detects a security attack on a microservice based on a metric sensitive dependency, according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology that is used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

In one type of application architecture, an application may be monolithic and correspond to a single unit. In another type of application architecture, an application may be formed from multiple, autonomous parts called "microservices." As compared to the monolithic architecture, the microservice architecture provides greater agility, elasticity and greater control for software quality assurance. The microservices for a cloud-native application may be highly distributed and open to potential attacks launched by services that are part of the application value chain. As compared to a traditional, monolithic application in which the functions and corresponding code are bundled together, a microservice has a significant reduction in the variation of code execution paths, and many microservices may be reduced to corresponding single functions.

Bad actors have a culture of continuous innovation so real-time detection and mitigation of security attacks may be of paramount importance to protecting the integrity of a business that relies on microservices. Security threat detection software, however, may face challenges in detecting security attacks on a microservice due to the microservice's limited variation of code execution paths.

In accordance with example implementations that are described herein, a security attack on a microservice is detected by monitoring the microservice's behavior and applying principles of mathematical chaos theory. More specifically, when deployed and running, a microservice's consumption of resources exhibits a behavior, which is referred to in chaos theory as "self-similarity." In this context, "self-similarity" refers to a behavior among a particular set of variables such that variations to one variable triggers changes to all variables proportionately to the original change while retaining all statistical properties, regardless of scale. The variables may exhibit a strict self-similarity (strict proportionate changes) or a lesser degree of self-similarity, depending on a sensitive dependency of the variables. The sensitive dependency is a measure of the correlation of the variable changes.

In accordance with example implementations, an observation engine time samples measurements of utilization metrics that are associated with a microservice. The utilization metrics characterize the microservice's use of resources. As examples, the metrics may include one or multiple of the following: a CPU utilization, an ephemeral storage utilization, a network utilization, a memory utilization, or a utilization of another resource. In accordance with example implementations, the observation engine assembles, or aggregates, the sampled measurements into a time sequence, or series, of samples. Each sample is multi-dimensional, with each dimension of the sample corresponding to a particular utilization metric. In an example, a particular dimension may correspond to a CPU utilization metric, another dimension may correspond to an ephemeral storage utilization metric, another dimension may correspond to a network utilization metric and another dimension may correspond to a memory utilization metric. Each sample may therefore be viewed as being a corresponding vector of utilization metric measurements, where each element of the vector corresponds to a particular dimension and is a measurement of the utilization metric that corresponds to the dimension.

The observation engine, in accordance with example implementations, performs a continuous statistical analysis on the samples. For example, in accordance with some implementations, the observation engine applies a sliding, or moving, time window to the time sequence of samples, and the observation engine calculates statistics for the utilization metric of each dimension based on the measurements of that utilization metric within the sliding window. As a more specific example, in accordance with some implementations, the observation engine may apply a sliding window of N samples to the N latest, or most recent, samples. As an example, the statistics may include the following for each metric: an average, or mean; a standard deviation; and a coefficient of variation.

The observation engine uses the statistics to predict measurements (including predicted ranges of the measurements) of the next sample. In this context, the "next sample" refers to a sample that proceeds the sliding window in time. In an example, the next sample may be a future sample (at the time of the statistics calculations) that is to be sampled at the next sampling time. In an example, the next sample may be a "current sample," which is the sample acquired at the most recent sampling time.

In accordance with some implementations, the observation engine may calculate the statistics for a future, next sample based on the N most recent samples and then sample the next sample, which becomes the current sample. The observation engine may then use the statistics and the measurements (also called "actual measurements") of the current sample to determine whether the measurements of the current sample are indicative of a security attack on the microservice, as further described herein.

In an example, the observation engine may use the statistics to determine predicted, or expected, ranges of the measurements of the next sample. In an example, the observation engine determines a mean, a standard deviation and a coefficient of variation of CPU utilization measurements of the samples within the sliding window, and based on these statistics, the observation engine determines an expected range for a CPU utilization measurement of the next sample. In an example, the observation engine determines a mean, a standard deviation and a coefficient of variation of ephemeral storage utilization measurements of the samples within the sliding window, and based on these statistics, the observation engine determines an expected range for an ephemeral utilization measurement of the next sample. In an example, the observation engine determines a mean, a standard deviation and a coefficient of variation of memory utilization measurements of the samples within the sliding window, and based on these statistics, the observation engine determines an expected range for a memory utilization measurement of the next sample. In an example, the observation engine determines a mean, a standard deviation and a coefficient of variation of network utilization measurements of the samples within the sliding window, and based on these statistics, the observation engine determines an expected range for a network utilization measurement of the next sample.

By comparing the actual measurements of the next sample with the corresponding expected measurement ranges, the observation engine may make a determination regarding whether the actual measurements are consistent with the expected ranges. In this context, the actual measurements being "consistent with" the expected ranges refers to a comparison of the actual measurements meeting a predefined criterion. In an example, the predefined criterion may be that all of the actual measurements are to be within the corresponding expected ranges for consistency, and the observation engine may determine, for example, that actual measurements are inconsistent with the expected ranges if at least one of the actual measurements falls outside of the corresponding expected range. In another example, the predefined criterion may be that a certain number (e.g., two) of the actual measurements are to be within the corresponding expected ranges for consistency.

In accordance with example implementations, the observation engine considers a sample whose actual measurements are inconsistent with the corresponding expected ranges to correspond to a "microburst event." Such a sample is referred to herein as a "microburst event-affiliated sample." In the context used herein, a "microburst event" refers to a particular sample that is a statistical anomaly, in view of the statistics of prior samples. In accordance with example implementations, the observation engine further analyzes a microburst event-affiliated sample for purposes of determining whether the sample corresponds to an entropic event. In the context used herein, an "entropic event" refers to an observed behavior of a microservice, which is associated with a security attack on the microservice.

In accordance with example implementations, the observation engine determines whether a microburst event-affiliated sample corresponds to an entropic event by calculating a measure of self-similarity, or sensitive dependency (or "metric sensitive dependency"), for the sample and comparing the calculated sensitive dependency to a threshold. The sensitivity dependency is a measure of the correlation of measurement changes associated with the microburst-affiliated sample. In this context, a "change" (or "measurement change") is the difference between the actual and predicted measurements. The change for a particular measurement may be represented by a parameter that is referred to herein as an actual coefficient of variation. The sensitive dependency is a measure of the correlation of the actual coefficients of variation. In an example, a one hundred percent sensitive dependency means that the changes are exactly proportional to each other. A sensitive dependency less than one hundred percent means that the changes are not exactly proportionate, and a sensitive dependency of zero means that changes are entirely independent with respect to each other.

In response to detecting an entropic event, the observation engine may initiate one or multiple responsive actions to further verify whether a security attack has occurred and/or perform remedial actions to mitigate and/or prevent harm. In an example of a responsive action, the observation engine may initiate a verification of a binary image that is associated with the microservice. The verification may include scanning the binary image, such as, for example, calculating a signature (e.g., a hash value) of the binary image and comparing the signature to a trusted, reference hash. As described further herein, in accordance with example implementations, the result of the verification may be used as feedback to tune the observation engine's security attack detection.

The sensitive dependency may be quantified by a parameter, which is called a "coefficient of sensitivity" herein. In accordance with example implementations, the observation engine calculates a coefficient of sensitivity for a microburst-affiliated sample, and based on the coefficient of sensitivity, the observation engine determines whether or not the microburst event-affiliated sample corresponds to an entropic event. The coefficient of sensitivity may be determined in a number of different ways, depending on the particular implementation. In an example, the observation engine may calculate an actual coefficient of variation for each dimension of a microburst event-affiliated sample, and the observation engine may set the coefficient of sensitivity to be equal to the range (e.g., the maximum less the minimum) of the actual coefficients of variation. In accordance with example implementations, the observation engine compares the coefficient of sensitivity to a predefined threshold, which defines the minimum degree of sensitive dependency for the microburst event-affiliated sample to not be considered to be associated with an entropic event. In response to the comparison indicating that the microburst event-affiliated sample does not exhibit the minimum degree of sensitive dependency, the observation engine may then assume a security attack has been detected and initiate one or multiple responsive actions.

In accordance with some implementations, the observation engine may detect security attacks on a microservice in real-time or near real-time. In this manner, the observation engine may, for each current sample, calculate statistics for the metrics based on a sliding window of N samples, using the measurements of the current sample and the measurements of the N−1 samples that immediately precede the current sample. The observation engine may then calculate expected measurement ranges for the future, next sample. In response to the aggregating measurements at the next sampling time to form the next sample, the observation may then determine whether sample corresponds to a microburst event and if so, determine, based on the coefficient of sensitivity, whether the sample corresponds to an entropic event. In accordance with example implementations, the time for the observation engine to detect a security attack may range from a relatively short detection time (e.g., microseconds to milliseconds) to a relatively longer detection time (e.g., one or multiple seconds), depending on the observation engine's sample time. The sample time, in accordance with example implementations, may be user-configurable, and in accordance with some implementations, the observation engine may adaptively adjust the sample time for purposes of tuning the observation engine's performance, as further described herein.

FIG. 1 depicts an example computer system 100, which contains one or multiple metric sensitivity dependency-based observation engines 160 (hereinafter called "observation engines 160") in accordance with example implementations. For the specific implementation that is depicted in FIG. 1 and described herein, the computer system 100 is a cloud computer system. However, in accordance with further example implementations, the computer system may not be affiliated with a cloud. In an example, a non-cloud computer system may have servers that have legacy architectures (also called "industry standard architectures" or "standard architectures") and which are adapted to contain respective observation engines 160. In an example, a non-cloud computer system may be a private enterprise system in which servers contain respective observation engines 160 and communicate over a wide area network (WAN) network infrastructure, although the non-cloud computer system may have other architectures, in accordance with further implementations.

For the specific example implementation that is depicted in FIG. 1, the cloud computer system 100 is affiliated with a particular cloud operator and provides multi-tenant cloud services for multiple clients, or tenants. The cloud services may be any of a number of different cloud services, such as Software as a Service (SaaS), Infrastructure as a Service (IaaS), Platform as a Service (PaaS), and so forth. Moreover, depending on the particular implementation, the cloud services may be affiliated with one of several different cloud infrastructures, such as a public cloud that is generally available to all potential users over a public network; a limited access private cloud that is provided over a private network (e.g., cloud services provided by an on-site data center); or a hybrid cloud that is a combination of public and private clouds.

The tenants may access domain nodes 110 (e.g., compute nodes) of the cloud computer system 100 via cloud clients (e.g., laptops, desktop computers, smartphones, tablet computers, wearable computers, and so forth), which are not depicted in FIG. 1. As depicted in FIG. 1, the domain nodes 110 may be interconnected by physical network fabric 184. In general, the physical network fabric 184 may be associated with one or multiple types of communication networks, such as (as examples) Fibre Channel networks, Gen-Z fabrics, Compute Express Link (CXL) fabrics, dedicated management networks, local area networks (LANs), WANs, global networks (e.g., the Internet), wireless networks, or any combination thereof. As also depicted in FIG. 1, the domain nodes 110 may be interconnected by logical connections 180, such as software-defined network (SDN) connections, software-defined compute (SDC) connections and software-defined storage (SDS) connections. As further depicted in FIG. 1, the cloud computer system 100 may include a domain node manager 190 that is part of a control plane of the cloud computing system and which may be coupled to the physical network fabric 184 and the logical connections 180. In general, the node manager 190 contains physical hardware resources and logical software resources for managing the domain nodes 110.

The domain node 110-1 may correspond to a computer platform 114, in accordance with example implementations. In this context, a "computer platform" refers to a unit that includes a chassis and hardware that is mounted to the chassis, where the hardware is capable of executing machine-executable instructions (or "software"). As examples, the computer platform 114 may be a blade server, a rack-mounted server, a client, a desktop, a smartphone, a storage array, a laptop computer, a tablet computer, or any other processor-based device.

In accordance with example implementations, the computer platform 114 contains one or multiple multicore central processing unit (CPU) semiconductor packages (or "sockets" or "chips"). In accordance with example implementations, the computer platform 114 may have a form factor, mechanical latch(es) and corresponding electrical connectors for purposes of allowing the computer platform 114 to be installed in and removed from a rack. The computer platform 114 may not be rack-mountable, in accordance with further implementations.

In accordance with example implementations, the computer platform 114 may have a cloud-native architecture that includes a host 120 and one or multiple smart I/O peripherals 150. As depicted in FIG. 1, the computer platform 114 may provide one or multiple application operating environments 140 that are within a cloud tenant domain. One or multiple microservices 144 may execute in the application operating environment 140.

In general, the application operating environment 140 may be a virtualized environment or a non-virtualized environment. In an example, a virtualized application operating environment 140 may be an environment in which microservices 144 execute inside container instances. As another example, a virtualized application operating environment 140 may be an environment in which the microservices 144 execute inside virtual machine instances. As another example of a virtualized application operating environment 140, microservices 144 may execute outside virtual machine instances but inside container instances. In an example of a non-virtualized application operating environment 140, the microservices 144 may have access to the unabstracted physical resources of the computer platform 114.

In the context used herein, a "microservice" refers to an instance of a subpart of an application that includes multiple subparts. The microservice 144 may be associated with one or multiple functions of the application. In an example, the microservices 144 for a given application may be distributed across multiple domain nodes 110. In another example, the microservices 144 for a given application may be located on the same domain node 110.

In accordance with example implementations, the host 120 may include one or multiple physical processors 124. In general, a processor 124 refers to a collection of one or multiple processing cores (e.g., CPU cores and/or GPU cores), which execute machine-readable instructions that may be stored in, for example, a memory 128 of the computer platform 114.

In accordance with example implementations, the memory 128 may be implemented using a collection of physical memory devices. In general, the memory devices that form the memory 128, as well as other memories and storage media that are described herein, are examples of non-transitory machine-readable storage media. In accordance with example implementations, the machine-readable storage media may be used for a variety of storage-related and computing-related functions of the computer platform 114. As examples, the memory devices may include semiconductor storage devices, flash memory devices, memristors, phase change memory devices, magnetic storage devices, a combination of one or more of the foregoing storage technologies, as well as memory devices based on other technologies. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with example implementations, one or multiple processors 124 may execute machine-readable instructions that are stored in the memory 128 for purposes of forming various software components of the host 120, such as the application operating environment 140, a hypervisor 132, an operating system 136, one or multiple microservices 144, one or multiple microservices 144 and other software components. In accordance with some implementations, a given microservice 144 may have an associated binary image 125. The binary image 125 contains the program code and associated data for the microservice 144. The binary image 125 has a corresponding signature, such as a signature that corresponds to a hash value that is generated by applying a particular hash function to the binary image 125.

In accordance with some implementations, the binary image 125 may have an associated trusted, reference signature, which corresponds to a binary image 125 in its verified state (e.g., the initial state of the binary image 125 when first installed) and which has not been altered or modified. Therefore, by checking a signature of a particular binary image 125 against its reference signature (in a process called verification of the binary image), a determination may be made whether or not the binary image 125 is valid. In accordance with some implementations, the verification of a binary image 125 may be made by a verifier entity, which may or may not be a component of the domain node 110 upon which the corresponding microservice 144 executes. In accordance with some implementations, the verifier entity may be within the control plane of the cloud computer system 100. More specifically, in accordance with some implementations, the verifier may be the node manager 190.

The smart I/O peripheral 150 may take on one of many different physical forms. In an example, the smart I/O peripheral 150 is a Peripheral Component Interconnect express (PCIe) card. In another example, the smart I/O peripheral 150 is a CXL card. The smart I/O peripheral 150, in general, provides processing capability, memory and acceleration for the host 120 with the goal of supporting the delivery of a variety of higher-level services to the workloads that are executed by the host 120. The backend I/O services may be non-transparent services or transparent services. An example of a non-transparent host service is a hypervisor virtual switch offloading service using PCIe direct I/O (e.g., CPU input-output memory management unit (IOMMU) mapping of PCIe device physical and/or virtual functions) with no host control. A host transparent backend I/O service does not involve modifying host software. As examples, the transparent host services may include network-related backend I/O services for the host 120, such as overlay network services, virtual switching services, virtual routing services, network function virtualization services, encryption services and firewall-based network protection services. As examples, the transparent host services may include storage-related backend I/O services for the host 120, such as storage acceleration services (e.g., non-volatile memory express (NVMe)-based services), direct attached storage services, or Serial Attached SCSI (SAS) storage services.

In accordance with example implementations, the smart I/O peripheral 150 includes a forwarding/policy enforcement subsystem 152, which supports service-to-service communications between services and microservices 144. In accordance with example implementations, the forwarding/policy enforcement subsystem 152 may be based on a service mesh, such as Istio. The forwarding/policy enforcement subsystem 152 collects, or aggregates, measurements of various utilization metrics associated with the microservices 144. The forwarding/policy enforcement subsystem 152, in accordance with example implementations, communicates these measurements to a metric sensitive dependency-based observation engine 160 (herein called an "observation engine 160") of the smart I/O peripheral 150. In accordance with example implementations, the measurements may correspond to measured utilization metrics for a particular microservice 144.

As examples, the utilization metrics may include such metrics as a CPU utilization, a memory utilization, an ephemeral storage utilization and a network utilization from sources (e.g., the OS 136, the hypervisor 132 and other components such as container and/or virtual machine management components) of the host 120. A "CPU utilization" refers to the ratio of the CPU time used by the microservice 144 to the total CPU time allocated to the microservice 144. A "memory utilization" refers to the ratio of the amount of memory used by the microservice 144 to the total memory allocated to the microservice 144. An "ephemeral storage utilization" refers to the ratio of the amount of ephemeral storage used by the microservice 144 to the total ephemeral storage allocated to the microservice 144. "Ephemeral storage" refers to the volatile temporary storage attached to the microservice 144, which is present during the lifetime of the microservice 144 and is not present otherwise. A "network utilization" refers to the ratio of the amount of network bandwidth used by the microservice 144 to the total network bandwidth allocated to the microservice 144.

The utilization metrics may include one or multiple metrics measuring utilizations of resources by the microservice 144 other than a CPU, ephemeral storage, memory or network, in accordance with further implementations. Moreover, in accordance with further implementations, the sample may include a measurement of a metric that represents a behavioral aspect of the microservice 144 other than the microservice's utilization of a particular resource.

In accordance with example implementations, the observation engine 160 is a software-based sensor. The observation engine 160 time samples the measurements that are received form the forwarding/policy enforcement subsystem 152 (at corresponding sample times) and aggregates the measurements into corresponding multi-dimensional samples. In accordance with example implementations, each dimension of the sample corresponds to a different utilization metric.

In accordance with example implementations, the observation engine 160 continuously determines and updates statistics for the metrics as the measurements are time sampled and aggregated into the time sequence. From the statistics, the observation engine 160 may then determine whether the most recent sample, or current sample, is affiliated with a microburst event (and is therefore considered to be a "microburst event-affiliated sample"). The observation engine 160 processes a microburst event-affiliated sample for purposes of determining whether the sample corresponds to an entropic event.

The recognition of an entropic event, in accordance with example implementations, prompts the observation engine 160 to initiate one or multiple responsive actions. In an example, responsive to determining that a particular sample corresponds to an entropic event, the observation engine 160 may initiate an action to verify the binary image 125 that is associated with the microservice 144. In another example, responsive to determining that a particular sample corresponds to an entropic event, the observation engine 160 may generate an alert to notify a component of the cloud computer system 100 and/or notify a human user (e.g., a system administrator).

As used herein, an "engine," such as the observation engine 160, can refer to one or multiple circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. For the particular example implementation that is depicted in FIG. 1, the smart I/O peripheral 150 includes one or multiple processors 164 (e.g., one or multiple processing cores) and a memory 166 that stores machine-readable instructions 168 that, when executed by the processor(s) 164, cause the processor(s) 164 to perform one or multiple functions for the observation engine 160, as described herein. Alternatively, an "engine," in accordance with further implementations, such as the observation engine 160, may be one or multiple hardware processing circuits that do not execute machine-readable instructions or a combination of one or multiple hardware processing circuits and circuits that execute machine-readable instructions.

In accordance with example implementations, the observation engine 160 may receive its configuration details from a controller 158 of the smart I/O peripheral 150, which provides control services. These control services may include setting initial tuning parameters of the observation engine 160, such as a measurement sampling rate and other tuning parameters, as described further herein. The initial tuning parameters may be based on user input as well as a profile of the microservice 144. The observation engine 160, in accordance with example implementations, uses the control services to report findings of entropic events to a centralized service plane (e.g., a service plane that includes the node manager 190), which provides service management governance for the cloud computer system 100.

Among its other features, the smart I/O peripheral 150 may include an overlay network subsystem 154 and a network interface 156 that interfaces the smart I/O peripheral 150 to the logical connections 180 and physical network fabric 184.

Figure 2:
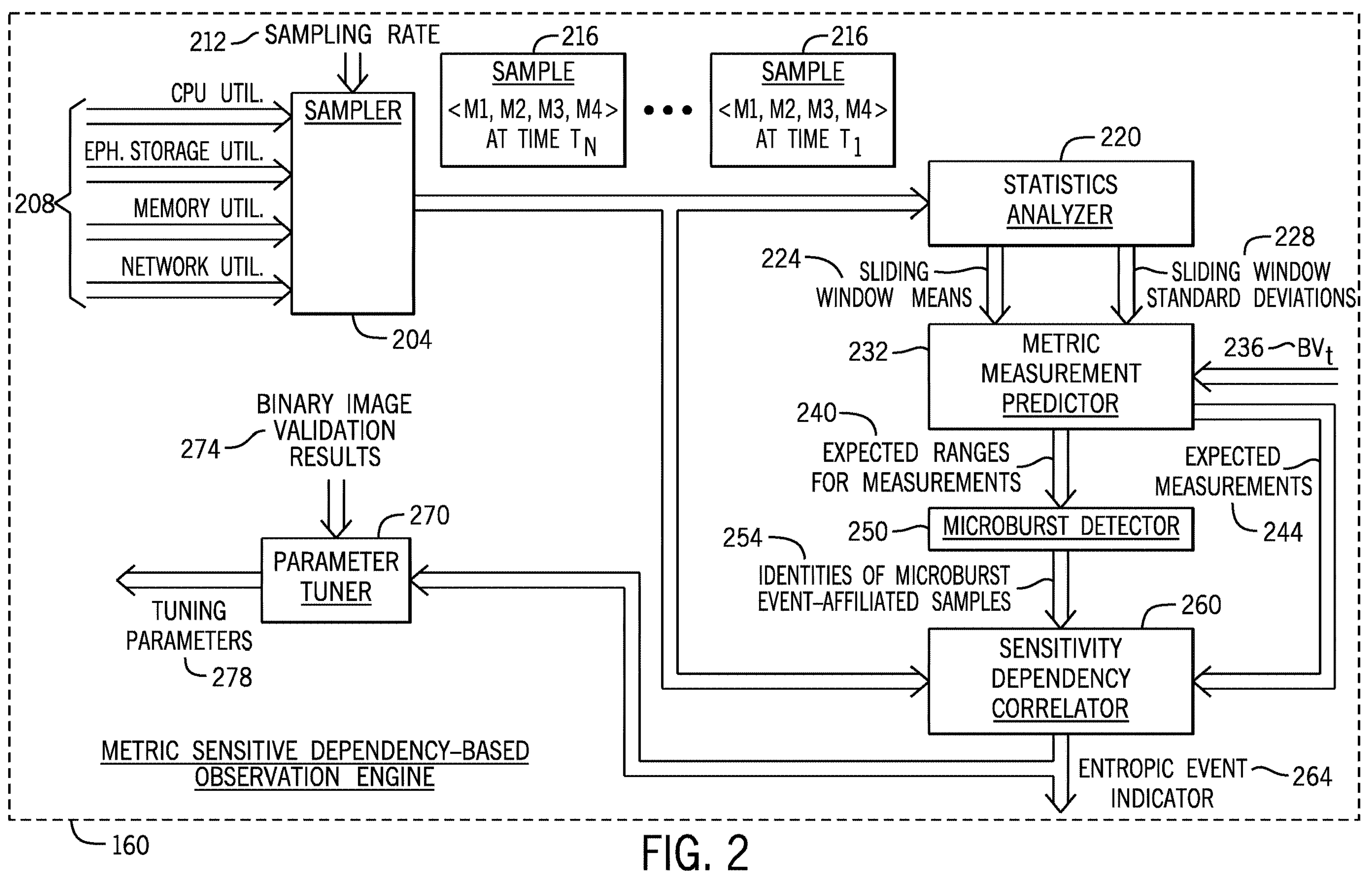
FIG. 2 is a block diagram of the observation engine of FIG. 1 according to an example implementation.

FIG. 2 depicts a block diagram of the observation engine 160, in accordance with example implementations. The observation engine 160 includes a sampler 204, which receives measurements 208 of various utilization metrics (e.g., the observation engine 160 receives the measurements from the forwarding/policy enforcement subsystem 152 of FIG. 1). In an example, the measurements 208 are consumption-based and normalized to a time scale. The sampler 204 may be configured with a sampling rate 212. In accordance with example implementations, the sampling rate 212 may be a configurable parameter, which serves as a tuning parameter for tuning the microburst detection and/or entropic event detection by the observation engine 160. In an example, in accordance with some implementations, the sampler 204 may be configured with a default sampling rate 212, such as, for example, one sample per second. Increasing the sampling rate 212, in general, improves the accuracy of the observation engine 160 in detecting entropic events but increases the processing load of the observation engine 160. Conversely, decreasing the sampling rate 212 may lower the processing load but decrease the entropic event detection accuracy.

As depicted in FIG. 2, in accordance with example implementations, the sampling by the sampler 204 produces a time sequence (or "time series") of samples 216. Each sample 216, in accordance example implementations, is a multi-dimensional sample, where each dimension of the sample corresponds to a particular utilization metric. As represented in FIG. 2, the sample 216 may be viewed as being a vector, where the components of the vector correspond to a particular sampling time T (e.g., sampling times $T_1$ to $T_N$ being represented in FIG. 2) and containing components representing the sampled measurements. For each example sample 216, FIG. 2 depicts an example vector <M1, M2, M3, M4> that represents sampled measurements M1, M2, M3 and M4, which correspond to respective dimensions of the sample 216.

In accordance with example implementations, a statistics analyzer 220 of the observation engine 160 receives the time sequence of samples 216 and performs a statistical analysis of the time sequence. In accordance with example implementations, the statistics and analyzer 220 uses a moving, or sliding, window of samples 216 for purposes of calculating a sliding window average, or mean 224, and a sliding window standard deviation 228 for each utilization metric. In accordance with example implementations, the statistics analyzer 220 is configured to apply this statistical analysis to the last N samples 216 of the time series, such as for example, the example samples 216 from time $T_1$ to $T_N$, as depicted in FIG. 2. In this manner, to calculate a particular set of sliding window means 224 and sliding window standard deviations 228, the statistics analyzer 220, for each utilization metric, calculates a sliding window mean 224 based on the measurement of the metric in the current (or most recent) sample 216 and the N−1 samples 216 that immediately precede the current sample 216.

The calculation of the sliding window mean 224 for each metric may be described as follows in Equation 1 (Eq. 1):

$$\mu = \frac{1}{N}\sum_{i=1}^{N} x_i, \quad \text{Eq. 1}$$

where "μ" represents the sliding window mean 224, "N" represents the number of samples within the sliding window, and "$x_i$" represents the measurement of the metric indexed to a particular sample 216 within the sliding window. The statistics analyzer's calculation of the sliding window standard deviation 228 (represented by "σ") may be described as follows in Eq. 2:

$$\sigma = \sqrt{\frac{\Sigma(x_i - \mu)^2}{N}}. \quad \text{Eq. 2}$$

The sliding window means 224 and the sliding window standard deviations 228 are received by and used by a metric measurement predictor 232 of the observation engine 160 for purposes of predicting the measurements of the next, future sample 216. More specifically, in accordance with example implementations, the metric measurement predictor 232 determines predicted, or expected, ranges 240 for the measurements of the next sample 216. For the expected ranges 240, the metric measurement predictor 232 may be configured with a behavior variation tolerance tuning parameter (called the "$BV_t$ parameter 236" herein). In accordance with example implementations, the metric measurement predictor 232 calculates a predicted coefficient of variation (called "$CV_p$" herein) for each metric. The $CV_p$ predicted coefficient of variation represents a predicted variation of the corresponding metric measurement from the moving standard deviation of the corresponding N samples 216 of the sliding window. The metric measurement predictor's calculation of the $CV_p$ predicted coefficient of variation may be described as follows in Eq. 3:

$$CV_{p=}\frac{1}{N}\sum_{i=1}^{N}\frac{\sigma}{\mu}. \quad \text{Eq. 3}$$

Using the $CV_p$ predicted coefficient of variation, the metric measurement predictor 232 may then calculate, for each predicted range 240, a predicted lower boundary (called "$LB_p$" herein) and a predicted upper boundary (called "$UB_p$" herein). In accordance with example implementations, the metric measurement predictor 232 calculates the $LB_p$ predicted lower boundary by decreasing the moving average (the mean) by one half of the $CV_p$ predicted coefficient of variation and decreasing the result by the $BV_t$ behavior variation tolerance, as described below in Eq. 4:

$$LB_p = \left(1 - \frac{CV_p}{2}\right)\mu(1 - BV_t). \quad \text{Eq. 4}$$

In accordance with example implementations, the metric measurement predictor 232 calculates the $UB_p$ predicted upper boundary by increasing the moving average by one half of the $CV_p$ predicted coefficient of variation and increasing the result by the $BV_t$ behavior variation tolerance, as described below in Eq. 5:

$$UB_p = \left(1 + \frac{CV_p}{2}\right)\mu(1 + BV_t). \quad \text{Eq. 5}$$

A microburst detector 250 of the observation engine 160 compares the actual measurements of the current sample 216 to the expected ranges 240 for the sample 216. This comparison may involve the microburst detector 250 determining whether the actual measurements are consistent with the expected ranges 240, as described herein. Based on this comparison, the microburst detector 250 may then determine whether the current sample corresponds to a microburst event. In accordance with some implementations, the microburst detector 250 compares each measurement of the current sample 216 to its corresponding expected range 240 for purposes of determining whether the measurement is outside of the predicted range 240. Stated differently, the microburst detector 250, for each measurement, determines whether the measurement is greater than the $UB_p$ predicted lower measurement boundary or less than the $LB_p$ predicted lower measurement boundary.

Based on the comparisons for the measurements of the current sample 216, the microburst detector 250 may then determine whether or not the measurements of the current sample are consistent with the expected ranges 240, and if not, then the microburst detector 250 identifies the current sample 216 as being affiliated with a microburst event. In an example, in accordance with some implementations, the microburst detector 250 may determine that the current sample 216 is affiliated with a microburst event responsive to a single measurement of the current sample 216 being outside of the corresponding expected range 240. In another example, the microburst detector 250 may deem a particular current sample as being affiliated with a microburst event in response to a predetermined number of actual measurements (e.g., two or more) being outside of their corresponding expected ranges 240. The microburst detector 250 may apply criteria for purposes of determining whether actual measurements are consistent with the expected ranges 240, in accordance with further implementations. Regardless of the methodology used, responsive to the detection of a microburst event, the microburst detector 250 may then, in accordance with example implementations, identify the current sample 216 as being affiliated with a microburst event, as depicted at 254.

A sensitivity dependency correlator 260 of the observation engine 160, in accordance with example implementations, may further analyze a sample 216 that has been identified as being affiliated with a microburst event, for purposes of making the further determination of whether or not the sample 216 corresponds to an entropic event (i.e., corresponds to a detection of security attack on the microservice). For this analysis, the sensitivity dependency correlator 260, in accordance with example implementations, calculates an actual coefficient of variation (called "$CV_a$" herein) for each measurement of the microburst event-affiliated sample 216. The $CV_a$ actual coefficient of variation represents a change of the actual measurement to a corresponding predicted measurement. More specifically, in accordance with some implementations, the sensitivity dependency correlator 260 may calculate the $CV_a$ actual coefficient of variation for a given measurement as described below in Eq. 6:

$$CV_a = \frac{x_a}{x_p} - 1, \quad \text{Eq. 6}$$

where "$x_a$" represents the actual measurement, and "$x_p$" represents the predicted measurement. As an example, the predicted measurement may be the corresponding mean that is determined from the sliding window. In the absence of an entropic event, the $CV_a$ actual coefficients of variations for the sample 216 should be similar, or close in value. Stated differently, in the absence of an entropic event, the measurements of the sample 216 vary approximately proportionally the same.

In accordance with example implementations, the sensitivity dependency correlator 260 quantifies when the $CV_a$ coefficients of variation are deemed to be close or are far apart enough to be considered associated with an entropic event using a coefficient of sensitivity (herein called "CS" herein). More specifically, in accordance with some implementations the sensitivity dependency correlator 260 may calculate the CS coefficient of sensitivity as described below in Eq. 7:

$$CS = \text{MAX}(CV_a) - \text{MIN}(CV_a), \quad \text{Eq. 7}$$

where "$\text{MAX}(CV_a)$" represents the maximum of the $CV_a$ actual coefficients of variation, and "$\text{MIN}(CV_a)$" represents the minimum of the $CV_a$ actual coefficients of variation. Stated differently, the CS coefficient of sensitivity, in accordance with example implementations, represents the range of the $CV_a$ actual coefficients of variation.

In accordance with example implementations, the sensitivity dependency correlator 260 may compare the CS coefficient of sensitivity to a threshold (called "$SV_t$" herein) for purposes of determining whether or not the sample 216 corresponds to an entropic event. More specifically, in accordance with some implementations, the sensitivity dependency correlator 260 may, for example, determine that the sample 216 corresponds to an entropic event in response to the CS coefficient of sensitivity being greater than the $SV_t$ threshold.

In accordance with example implementations, the sensitivity dependency correlator 260 provides an entropic event indicator 264 representing whether or not an entropic event has been detected. Responsive to the entropic event indicator 264 indicating detection of an entropic event, one or multiple responsive actions may then be initiated by the sensitivity dependency correlator 260. As an example, a responsive action may include the initiation of an alert to system personnel (e.g., a system administrator) or one or multiple components of the cloud computer system. As another example, the responsive action may include initiating a scan of the binary image associated with the microservice for purposes of verify the binary image.

In accordance with some implementations, the observation engine 160 includes a parameter tuner 270. The parameter tuner 270 may, in accordance with example implementations, may adaptively adjust one or multiple tuning parameters 278 used by the observation engine 160 for such purposes as decreasing a false positive rate and decreasing a false negative rate. In accordance with some implementations, the parameter tuner 280 may, for example, receive data representing a result of the binary image validation, as depicted at 274. For example, in response to determining that the scanning of the binary image verified the binary image (i.e., thereby indicating a false positive), the parameter tuner 270 may modify one or multiple tuning parameters 278 for purposes of decreasing the false positive rate associated with the observation engine 160.

In accordance with some implementations, the parameter tuner 270 may not modify any tuning parameters 278 in response to a single, isolated false positive, but rather the parameter tuner 270 decide whether or not to modify the tuning parameter(s) 278 based on a rate of false positives. Likewise, in accordance with example implementations, the parameter tuner 270 may receive data representing false negatives in which observation engine 160 did not detect what turned out to be an entropic event (i.e., a security attack), and the parameter tuner 270 may then modify one or multiple tuning parameters 278 to increase the sensitivity of the observation engine 160. The tuning parameter's decision on whether or not to increase the sensitivity may be based on a rate of false negatives.

As an example, the parameter tuner 270 may increase the sensitivity and accuracy of the observation engine 160 by increasing the sampling rate 212, and the parameter tuner 270 may decrease the sensitivity and decrease the load of the observation engine 160 by decreasing the sampling rate 212. As another example, the parameter tuner 270 may increase the sensitivity of the observation engine 160 by decreasing the $BV_t$ behavior variation tolerance, and the parameter tuner 270 may decrease the sensitivity and decrease the rate of false positives by increasing the $BV_t$ behavior variation tolerance. As another example, the parameter tuner 270 may increase the sensitivity of the observation engine 160 by decreasing the $SV_t$ coefficient of sensitivity threshold, and the parameter tuner 270 may decrease the sensitivity and decrease the rate of false positives by increasing the $SV_t$ coefficient of sensitivity threshold.

Figure 3:
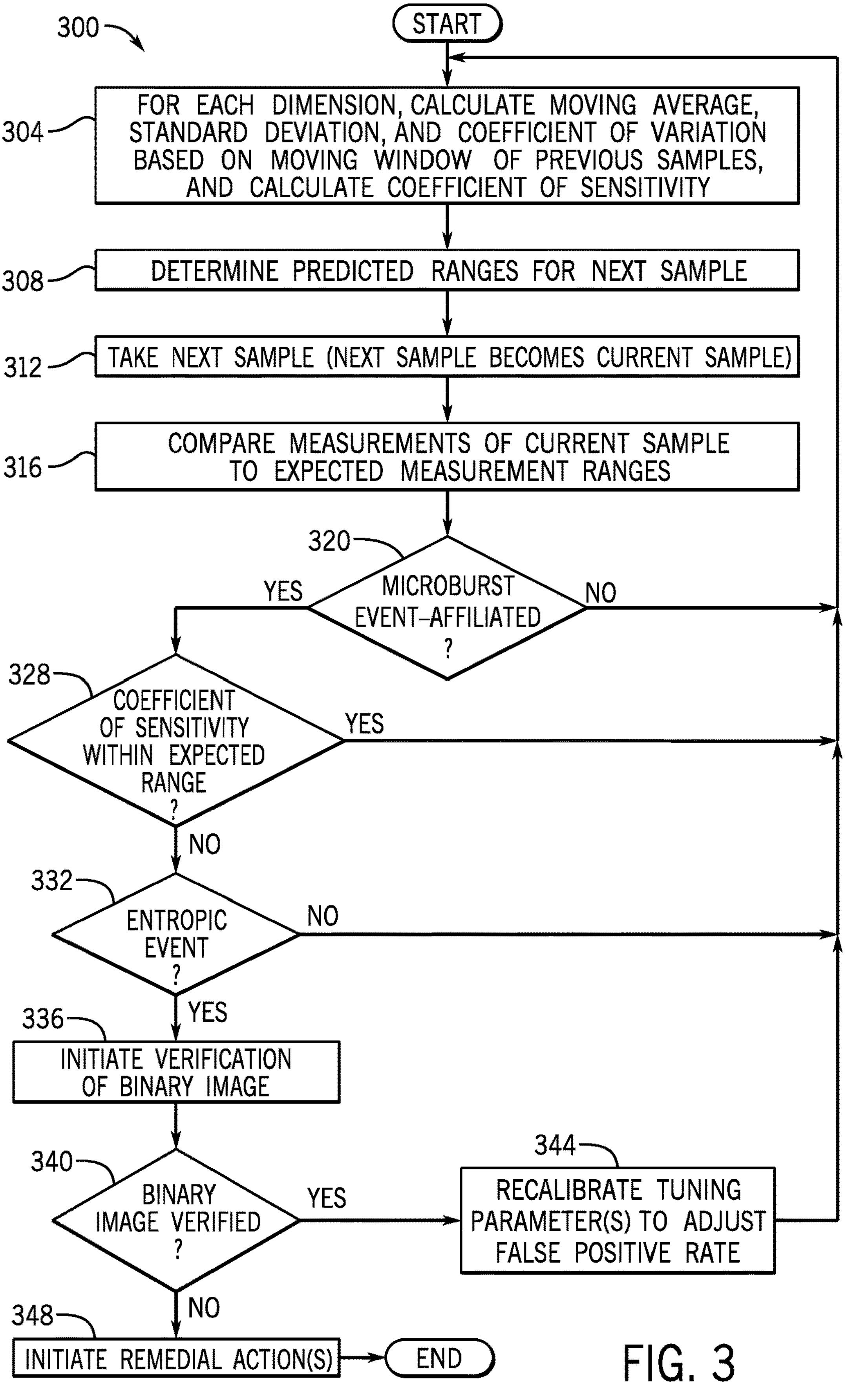
FIG. 3 is a flow diagram depicting a process to evaluate whether a binary image associated with a microservice should be verified according to an example implementation.

FIG. 3 depicts a process 300 that may be performed (e.g., performed by the observation engine 160 of FIGS. 1 and 2) for purposes of detecting a security attack on a microservice and responding to the security attack detection, in accordance with example implementations. Referring to FIG. 3, in accordance with example implementations, the process 300 includes, pursuant to block 304, for each dimension and using a moving window of previous samples, calculating a moving average, a standard deviation and a coefficient of variation. Moreover, in accordance with example implementations, the process 300 includes, pursuant to block 304, calculating a coefficient of sensitivity for the next sample. Pursuant to block 308, the process 300 includes determining predicted ranges for the next sample.

As depicted at 312, the process 300 includes taking the next sample and then comparing (block 316) the actual measurements of the sample to the predicted ranges. Based on this determination, the process 300 includes determining (decision block 320) whether a microburst event has been detected. If not, then the process returns to block 304 to update the moving average, the standard deviation and the coefficient of variation.

Otherwise, if a microburst event is detected (decision block 320), then, pursuant to decision block 328, the process 300 includes determining whether the coefficient of sensitivity is within an expected range. In accordance with some implementations, this determination includes comparing the coefficient of sensitivity to a threshold, and based on this comparison (e.g., the coefficient of sensitivity being greater than the threshold), proceeding with determining (decision block 332) that the sample corresponds to an entropic event.

In an example, pursuant to decision block 332, an entropic event is detected based on the processing of the latest sample, such that if the sample is determined to be microburst event-affiliated (decision block 320) and the associated sensitive dependency is determined to be outside of the expected range (decision block 328), then the entropic event is deemed to have been detected. In another example, pursuant to decision block 332, an entropic event is detected based on the affiliation of the latest sample with a microburst event (decision block 320), the determination that the associated sensitive dependency is outside of the expected range (decision block 328), and one or multiple other criteria being satisfied (e.g., a certain number of samples of the last P samples have been determined to be microburst event-affiliated and have associated sensitive dependencies outside of the expected range). If the sample does not correspond to an entropic event, then, pursuant to decision block 332, control returns to block 304.

If an entropic event has been detected (decision block 332) then, pursuant to block 336, a verification of the binary image associated with the microservice may then be initiated. If the verification of the binary image is verified, then, pursuant to block 344, one or multiple tuning parameters may then be recalibrated (depending on the particular policy) to lower a false positive rate, and control returns to block 304. If the binary image was not verified (decision block 340), then one or multiple remedial actions may then be initiated, pursuant to block 348.

Referring to FIG. 4, in accordance with example implementations, a non-transitory machine-readable storage medium 400 stores machine-readable instructions 404. The instructions 404, when executed by a machine, cause the machine to aggregate a time sequence of samples. Each sample has a plurality of dimensions that correspond to respective metrics that are associated with a microservice. Each sample includes, each dimension, a measurement of the metric that corresponds to the dimension. In an example, the metrics may correspond to resource utilizations of the microservice. In an example, a metric may be a CPU utilization of the microservice. In another example, a metric may be an ephemeral storage utilization of the microservice. In another example, a metric may be a memory utilization of the microservice. In another example, a metric may be a network utilization of the microservice.

In an example, the aggregation of the time sequence of samples may be performed by a smart I/O peripheral. In an example, an observation engine of a smart I/O peripheral may receive measurements corresponding to the metrics from a forwarding and policy enforcement subsystem of the smart I/O peripheral, and the observation may sample the received measurements according to a configurable time sampling rate. In an example, the smart I/O peripheral may include a processor that executes the instructions 404, and the storage medium 400 may be a memory of the smart I/O peripheral.

The instructions 404, when executed by the machine, further cause the machine to determine statistics of the measurements of first samples of the time sequence of samples. In an example, the statistics may include, for each dimension, a mean and a standard deviation. In an example, the statistics may include, for each dimension, a predicted coefficient of variation for the next sample of the time sequence of samples. In an example, for each dimension, the predicted coefficient of variation may be based on a mean and a standard deviation determined from the observed samples.

The instructions 404, when executed by the machine, cause the machine to, based on the statistics, determine that a given sample of the time sequence of samples corresponds to a microburst event. In an example, the given sample may be the latest, or current, sample of the time sequence of samples. In an example, a microburst event corresponds to a statistical anomaly based on the statistics of the measurements of the first samples. In an example, the given sample may be the latest, or current, sample, and the machine may determine that the current sample corresponds to a microburst prior to the time sampling of the next sample.

The instructions 404, when executed by the machine, cause the machine to determine a sensitive dependency of the metrics based on the measurements of the given sample. In an example, the sensitive dependency is a measure of the self-similarity of the measurements according to mathematical chaos theory. In an example, the determination of the sensitive dependency may include determining actual coefficients of variation of the measurements of the given sample, and setting a coefficient of sensitive dependency equal to the span between the maximum and minimum of the actual coefficients of variation.

The instructions 404, when executed by the machine, cause the machine to determine whether the microservice has been subjected to a security attack based on the sensitive dependency. In an example, the determination of whether the microservice has been subjected to a security attack may be made in real time responsive to the latest sampling of the microservice's utilization metrics. In an example, the determination of whether the microservice has been subjected to a security attack may be based on the comparison of a coefficient of sensitive dependency to a sensitive dependency threshold. In an example, the sensitive dependency threshold may be a tuning parameter that is changeable for purposes of controlling a performance (e.g., a rate of false positives or a rate of false negatives) of the security attack detection. In an example, a binary image of the microservice may be verified based on the sensitive dependency indicating a security attack, the binary image may be determined to be valid, a false positive rate may be updated, and the sensitive dependency threshold may be adjusted based on a false positive rate. In another example, one or multiple other tuning parameters (e.g., a behavior tolerance parameter to set expected ranges for the given sample or the sampling rate) may be adjusted based on a false positive rate.

Figure 5:
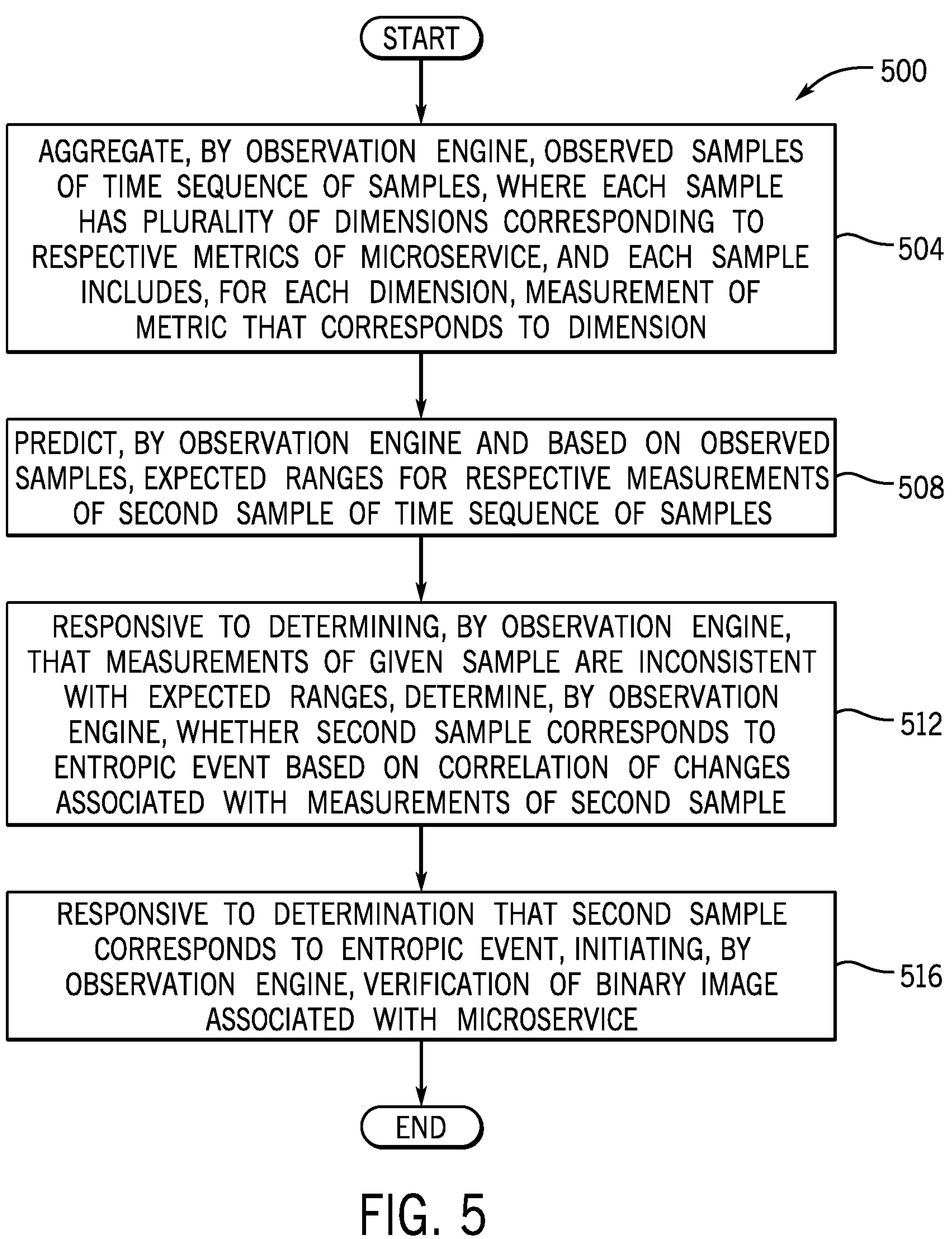
FIG. 5 is a flow diagram depicting a process to determine whether to initiate an action to verify an integrity of a microservice based on a metric sensitive dependency according to an example implementation.

Referring to FIG. 5, in accordance with example implementations, a process 500 includes aggregating (block 504), by an observation engine, observed samples of a time sequence of samples. Each sample has a plurality of dimensions that correspond to respective metrics of a microservice. Each sample includes, for each dimension of the plurality of dimensions, a measurement of the metric that corresponds to the dimension. In an example, the metrics may correspond to resource utilizations of the microservice. In an example, a metric may be a CPU utilization of the microservice. In another example, a metric may be an ephemeral storage utilization of the microservice. In another example, a metric may be a memory utilization of the microservice. In another example, a metric may be a network utilization of the microservice.

In an example, the observation engine may be a component of a smart I/O peripheral of a domain node of a cloud computing system. In an example, the observation engine may receive measurements corresponding to the metrics from a forwarding and policy enforcement subsystem of the smart I/O peripheral, and the observation may sample the received measurements according to a configurable time sampling rate. In an example, the smart I/O peripheral may include a processor that executes the instructions 404 to form the observation engine.

The process 500 includes predicting (block 508), by the observation engine and based on the observed samples, expected ranges for respective measurements of a second sample. In an example, the expected ranges may be based on statistics (e.g., a mean, a standard deviation, and a coefficient of variation) that are calculated for each metric based on a sliding window (e.g., the measurements corresponding to the last N samples) of observed measurements. In an example, an expected range for a particular dimension may be calculated based on a mean and a coefficient of variation. In an example, upper and lower boundaries of an expected range may be modulated by a behavior variation tolerance. In an example, the behavior variation tolerance may serve as a tuning lever to regulate a performance (e.g., false positive rate) of detecting entropic events.

The process 500 includes, responsive to determining that the measurements of the second sample are inconsistent with the expected ranges, determining (block 512), by the observation engine, whether the second sample corresponds to an entropic event based on a correlation of changes associated with the measurements of the second sample. In an example, an entropic event is an occurrence corresponding to a sample having one or multiple measurements that are inconsistent with statistics observed from other samples. In an example, an entropic event may be an occurrence corresponding to one or multiple measurements of a sample being outside of expected ranges for the measurements.

In an example, the changes may be represented by corresponding actual coefficients of variation. In an example, correlating the changes includes determining a sensitive dependency among the metrics. In an example, determining a sensitive dependency includes evaluating a range of the actual coefficients of variation. In an example, evaluating the range of the actual coefficients of variation includes determining a minimum of the actual coefficients of variation, determining a minimum of the coefficients of variation, and determining a difference of the maximum and the minimum. In an example, the difference of the maximum and the minimum represents a coefficient of sensitivity. In an example, determining whether the second sample corresponds to an entropic event includes comparing the coefficient of sensitivity to a threshold.

The process 500 includes, responsive to the determination that the second sample corresponds to an entropic event, initiating (block 516), by the observation engine, a verification of a binary image associated with the microservice. In an example, verifying the binary image includes calculating a signature (e.g., a hash value) of the binary image and comparing the signature to a reference signature for the binary image. In an example, the verification of the binary image may be performed by a cloud computer system control plane. In an example, the sensitive dependency threshold may be adjusted based on a false positive rate. In another example, one or multiple other tuning parameters (e.g., a behavior tolerance parameter to set expected ranges for the given sample or the sampling rate) may be adjusted based on a false positive rate.

Figure 6:
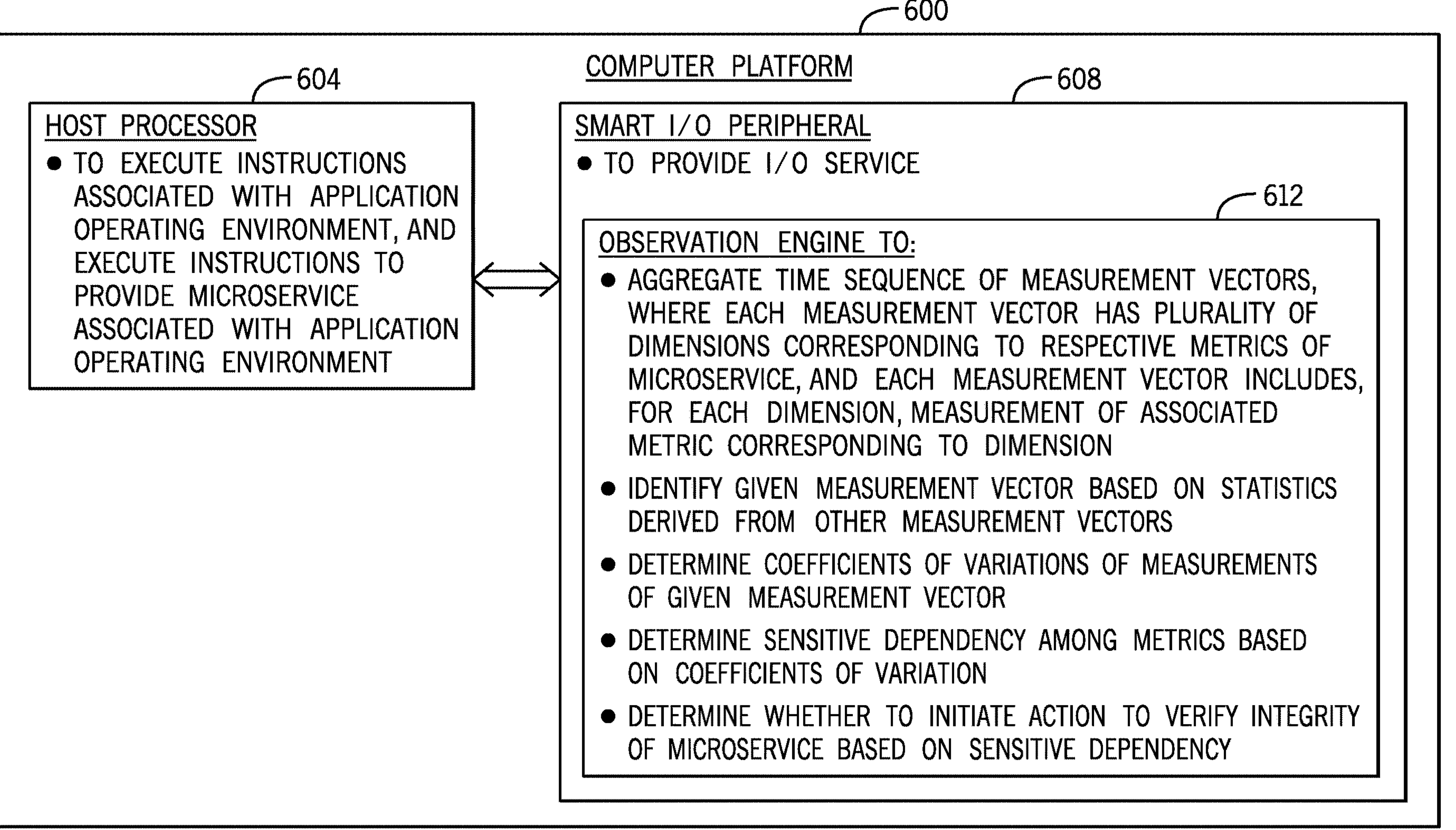
FIG. 6 is a schematic diagram of a computer platform that includes an observation engine to determine whether to initiate an action to verify an integrity of a microservice based on a sensitive dependency among metrics according to an example implementation.

Referring to FIG. 6, accordance with example implementations, a computer platform 600 includes a host processor 604 and a smart I/O peripheral 608. In an example, the host processor 604 may include one or multiple CPU processing cores or one or multiple GPU processing cores. In an example, the smart I/O peripheral 608 may be a PCIe card. In an example, the computer platform 600 may be a blade server. In another example, the computer platform 600 may be a rack server. The host processor 604 executes instructions that are associated with an application operating environment. In an example, the application operating environment may be a virtualized environment in which physical resources of the computer platform 600 are abstracted. In an example, the application operating environment may be a non-virtualized environment that allows direct access to physical resources of the computer platform 600. In an example, the computer platform 600 may correspond to a domain node of a cloud computer system. In another example, the computer platform 600 may be part of a system other than a cloud computer system.

The host processor 604 executes instructions to provide a microservice associated with the application operating environment. As an example, the microservice may be one of a collection of microservices that are collectively associated with an application. The smart I/O peripheral 608 provides an I/O service that is associated with a cloud operator domain. In an example, the I/O service may be a transparent service. In examples, the transparent service may be a network-related service. In examples, the network-related service may be an encryption service, an overlay network access service, a firewall-based network protection service, a virtual switching service, a virtual routing service or a network function virtualization service. In an example, the transparent service may be a storage I/O service. As examples, the storage I/O service may be a storage acceleration service, a direct attached storage service or a Serial Attached SCSI (SAS) service. In an example, the I/O service may be a non-transparent service. In an example, the non-transparent service may be a hypervisor virtual switch offloading service.

The smart I/O peripheral 608 includes an observation engine 612. In an example, the observation engine 612 may include one or multiple circuits. In an example, the circuits may be hardware processing circuits, which can include any or some combination of a microprocessor, a core of a multi-core microprocessor, a microcontroller, a programmable integrated circuit, a programmable gate array, an ASIC, or another hardware processing circuit. In an example, the observation engine 612 may include one or multiple processors that execute machine-readable instructions to perform one or multiple functions for the observation engine. In an example, the observation engine may include one or multiple hardware processing circuits that do not execute machine-readable instructions or a combination of one or multiple such hardware processing circuits and circuits that execute machine-readable instructions.

The observation engine 612 aggregates a time series of measurement vectors. Each measurement vector has a plurality of dimensions corresponding to respective metrics of the microservice. Each measurement vector includes, for each dimension, a measurement of the associated metric corresponding to the dimension. In an example, the metrics may correspond to resource utilizations of the microservice.

In an example, a metric may be a CPU utilization of the microservice. In another example, a metric may be an ephemeral storage utilization of the microservice. In another example, a metric may be a memory utilization of the microservice. In another example, a metric may be a network utilization of the microservice. In an example, the smart I/O peripheral may include a forwarding and policy enforcement subsystem, and the observation engine may receive measurements corresponding to the metrics from the forwarding and policy enforcement subsystem and sample the received measurements according to a configurable time sampling rate to aggregate the time series of vector measurements.

The observation engine 612 identifies a given measurement vector based on statistics, which are derived from other measurement vectors. In an example, the statistics may include, for each dimension, a mean, a standard deviation, and a coefficient of variation, and the observation engine 612 may calculate the statistics based on a sliding window corresponding to the last N measurement vectors. In an example, the observation engine 612 may identify the given measurement vector by determining that one or multiple measurements of the given measurements are unexpected according to the statistics. In an example, a measurement being unexpected corresponds to the measurement falling outside of an expected range derived from a mean, a standard deviation and a coefficient of variation calculated from other measurements of the same dimension.

The observation engine 612 determines coefficients of variations of the measurements of the given measurement vector. In an example, the coefficients of variation may be actual coefficients of variation. The observation engine 612 determines a sensitive dependency among the metrics based on the coefficients of variation. In an example, the sensitive dependency may be represented by a coefficient of sensitivity. In an example, the observation engine 612 may determine the coefficient of sensitivity by determining a minimum of actual coefficients of variation, determining a maximum of actual coefficients of variation, and determining a difference of the maximum and minimum. In an example, the sensitive dependency may represent a measure of self-similarity of the metrics.

The observation engine 612 determines whether to initiate an action to verify an integrity of the microservice based on the sensitive dependency. In an example, the observation engine 612 may compare a coefficient of sensitivity, which represents the sensitive dependency, to a threshold and determine whether or not to initiate the action based on a result of the comparison. In an example, the action to verify the integrity may be an integrity verification of a binary image that is associated with the microservice.

In accordance with example implementations, the statistics includes means and standard deviations of the first samples. Expected ranges for respective measurements of the given sample are determined, and responsive to determining that at least one measurement of the respective measurements is outside of the respective range, the given sample is identified as corresponding to the microburst event. Among the potential advantages, a security attack on a microservice may be detected for a wide range of observable changes to the microservice's behavior.

In accordance with example implementations, coefficients of variation for respective measurements of the given sample are determined, and the sensitive dependency is determined based on a range of the coefficients of variation. Among the potential advantages, a security attack on a microservice may be detected for a wide range of observable changes to the microservice's behavior.

In accordance with example implementations, for each dimension of the plurality of dimensions, statistics are determined, including a mean and a standard deviation. An expected measurement range for each dimension may be determined based on the means and standard deviations. The measurements of a given sample may be compared to the corresponding expected measurement ranges, and the determination of whether the given sample corresponds to the microburst event may be determined based on a result of the comparison. Among the potential advantages, a security attack on a microservice may be detected for a wide range of observable changes to the microservice's behavior.

In accordance with example implementations, for a given expected measurement range of the expected measurement ranges, a predicted coefficient of variation for the measurement corresponding to the given expected measurement range may be determined based on a first mean of the means and a first standard deviation of the standard deviations, and the given expected measurement range may be determined based on the first mean and the predicted coefficient of variation. Among the potential advantages, a security attack on a microservice may be detected for a wide range of observable changes to the microservice's behavior.

In accordance with example implementations, the boundaries defining the expected measurement range may be modulated based on a tuning parameter. Among the potential advantages, a security attack on a microservice may be detected for a wide range of observable changes to the microservice's behavior.

In accordance with example implementations, a determination may be made, based on the sensitive dependency, whether to initiate inspection of a binary image associated with the microservice. Among the potential advantages, a security attack on a microservice may be detected for a wide range of observable changes to the microservice's behavior.

In accordance with example implementations, boundaries defining the expected measurement range may be modulated based on a tuning parameter. Inspection of the binary image may be initiated, and responsive to the inspection determining that the binary image is valid, the tuning parameter may be adjusted. Among the potential advantages, a security attack on a microservice may be detected for a wide range of observable changes to the microservice's behavior.

In accordance with example implementations, the metrics include at least one of a CPU utilization of the microservice, an ephemeral storage utilization of the microservice, a memory utilization of the microservice, or a network utilization of the microservice. Among the potential advantages, a security attack on a microservice may be detected for a wide range of observable changes to the microservice's behavior.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A non-transitory machine-readable storage medium that stores machine-readable instructions that, when executed by a hardware processor, cause a peripheral of a computer platform to:

detect whether a microservice executing on a host of the computer platform has been subjected to a security attack based on an analysis of metric data associated with the microservice, wherein detecting the security attack comprises the peripheral:

accessing, by a service mesh, measurements of metrics associated with the microservice, wherein the metrics are associated with respective dimensions of a plurality of dimensions;

time sampling the measurements to provide a time sequence of samples, wherein each sample of the time sequence of samples has the plurality of dimensions, and each sample of the time sequence of samples comprises, for each dimension of the plurality of dimensions, a measurement of the metric that corresponds to the dimension;

determining statistics of the measurements of first samples of the time sequence of samples;

based on the statistics, determining that a given sample of the time sequence of samples corresponds to a microburst event;

determining coefficients of variation for respective measurements of the given sample;

determining a sensitive dependency based on a range of the coefficients of variation;

determining that the microservice has been subjected to the security attack based on the sensitive dependency; and initiate a responsive action responsive to determining that the microservice has been subjected to the security attack.

2. The storage medium of claim 1, wherein:

the statistics comprises means and standard deviations of the first samples;

the instructions, when executed by the hardware processor, further cause the peripheral to:

determine expected ranges for respective measurements of the given sample; and responsive to determining that at least one measurement of the respective measurements is outside of the respective range, identifying the given sample as corresponding to the microburst event.

3. The storage medium of claim 1, wherein the instructions, when executed by the hardware processor, further cause the peripheral to:

for each dimension of the plurality of dimensions, determine a mean and a standard deviation of the measurements of the first samples corresponding to the dimension;

based on the means and standard deviations, determine an expected measurement range corresponding to each dimension of the plurality of dimensions;

for each dimension of the plurality of dimensions, compare the measurement of the given sample associated with the dimension to the measurement range corresponding to the dimension to determine a given result; and based on the given result, determine that the given sample corresponds to the microburst event.

4. The storage medium of claim 3, wherein the instructions, when executed by the hardware processor, further cause the peripheral to, for a given expected measurement range of the expected measurement ranges:

determine a predicted coefficient of variation for the measurement corresponding to the given expected measurement range based on a first mean of the means and a first standard deviation of the standard deviations; and determine the expected measurement range based on the first mean and the predicted coefficient of variation.

5. The storage medium of claim 3, wherein the instructions, when executed by the hardware processor, further cause the peripheral to modulate boundaries defining the expected measurement range based on a tuning parameter.

6. The storage medium of claim 1, wherein the instructions, when executed by the hardware processor, further cause the peripheral to, responsive to a determination of the security attack, initiate inspection of a binary image associated with the microservice.

7. The storage medium of claim 6, wherein the instructions, when executed by the hardware processor, further cause the peripheral to:

modulate boundaries defining an expected measurement range based on a tuning parameter;

initiate the inspection of the binary image; and responsive to the inspection determining that the binary image is valid, adjust the tuning parameter.

8. The storage medium of claim 1, wherein the metrics comprise at least one of a CPU utilization of the microservice, an ephemeral storage utilization of the microservice, a memory utilization of the microservice, or a network utilization of the microservice.

9. A computer platform comprising:

a host processor to execute instructions associated with an application operating environment, and execute instructions to provide a microservice associated with the application operating environment; and a smart input/output (I/O) peripheral to provide an I/O service and detect whether the microservice has been subjected to a security attack based on an analysis of metric data associated with the microservice, wherein the smart I/O peripheral comprises:

a service mesh interface to access measurements of metrics associated with the microservice, wherein the metrics are associated with respective dimensions of a plurality of dimensions; and an observation engine to:

aggregate a time series of measurement vectors, wherein each measurement vector of the time series of measurement vectors has the plurality of dimensions, and each measurement vector of the time sequence of vectors comprises, for each dimension of the plurality of dimensions, a measurement of the associated metric corresponding to the dimension;

identify a given measurement vector of the time series of measurement vectors based on statistics derived from other measurement vectors of the time series of measurement vectors;

determine coefficients of variation of the measurements of the given measurement vector;

determine a sensitive dependency among the metrics based on the coefficients of variation; and detect the security attack based on the sensitive dependency.

10. The computer platform of claim 9, wherein the observation engine to determine a maximum of the coefficients of variation, determine a minimum of the coefficients of variation, and determine the sensitive dependency based on the maximum and the minimum.

11. The computer platform of claim 9, wherein the observation engine to further:

determine expected ranges for the measurements of the given measurement vector based on statistics determined for other measurement vectors of the time sequence of measurement vectors;

for each dimension of the plurality of dimensions, compare the measurement of the given measurement vector associated with the dimension to an expected range of the expected ranges to determine a given result; and identify the given measurement vector based on the given result results.

12. The computer platform of claim 11, wherein:

the time series of measurement vectors has an associated time sampling rate;

the observation engine modulates the expected ranges based on a behavior variation tolerance;

the observation engine determines whether to initiate an action to verify an integrity of the microservice based on a comparison of the sensitive dependency to a sensitivity dependency threshold;

the observation engine initiates the action of verify the integrity of the microservice; and responsive to the action confirming the integrity of the microservice, the observation engine to modify at least one of the time sampling rate, the behavior variation tolerance or the sensitivity dependency threshold.

* * * * *